United States Patent
Nobuyuki et al.

(10) Patent No.: US 6,639,766 B2
(45) Date of Patent: Oct. 28, 2003

(54) MAGNETO-RESISTANCE EFFECT TYPE COMPOSITE HEAD AND PRODUCTION METHOD THEREOF

(75) Inventors: Ishiwata Nobuyuki, Tokyo (JP); Hisanao Tsuge, Tokyo (JP); Hisao Matsutera, Tokyo (JP); Yuji Tsukamoto, Tokyo (JP); Masafumi Nakada, Tokyo (JP); Atsushi Kamijo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/983,359

(22) Filed: Oct. 24, 2001

(65) Prior Publication Data

US 2002/0027753 A1 Mar. 7, 2002

Related U.S. Application Data

(62) Division of application No. 09/204,222, filed on Dec. 3, 1998, now Pat. No. 6,333,842.

(30) Foreign Application Priority Data

Dec. 5, 1997 (JP) .............................. 9-335501

(51) Int. Cl.[7] ................................ G11B 5/39
(52) U.S. Cl. ................... 360/324.2; 29/603.14
(58) Field of Search .................. 360/324.2; 29/603.13, 29/603.14, 603.15; 216/41, 22, 40; 257/295, 421–427; 365/171, 173, 158; 427/131; 205/122; 438/3

(56) References Cited

U.S. PATENT DOCUMENTS

| 5,018,037 A | 5/1991 | Krounbi et al. |
| 5,434,826 A | 7/1995 | Ravipati et al. |
| 5,650,958 A | 7/1997 | Gallagher et al. |

(List continued on next page.)

FOREIGN PATENT DOCUMENTS

| JP | 61126618 | 6/1986 |
| JP | 4103014 | 4/1992 |
| JP | 563254 | 3/1993 |
| JP | 5151533 | 6/1993 |
| JP | 60113313 | 6/1993 |
| JP | 6244477 | 9/1994 |
| JP | 7262520 | 10/1995 |
| JP | 870148 | 3/1996 |
| JP | 870149 | 3/1996 |
| JP | 8316548 | 11/1996 |
| JP | 9209292 | 4/1997 |
| JP | 9282616 | 10/1997 |
| JP | 9288807 | 11/1997 |
| JP | 11213351 | 8/1999 |

OTHER PUBLICATIONS

R.P. Hunt, "A magnetoresistive readout transducer," 1971, pp. 150–154, IEEE Trans. on Magn.
C. Tsang et al., "Design, fabrication & testing of spin–valve read heads for high density recording," 1994, pp. 3801–3806, IEEE Trans. on Magn.

(List continued on next page.)

Primary Examiner—William Klimowicz
(74) Attorney, Agent, or Firm—Young & Thompson

(57) ABSTRACT

A magneto-resistance effect ("MR") type composite head includes a reproduction head with an MR element arranged between a first and a second magnetic shield; and a recording head arranged adjacent to the reproduction head so as to use the second magnetic shield as a first magnetic pole film and having a second magnetic pole film opposing to the first magnetic pole via a magnetic gap; the MR element includes a center region including a ferromagnetic tunnel junction magneto-resistance effect film having a first ferromagnetic layer and a second ferromagnetic layer for generating a magneto-resistance effect using the first and the second magnetic shields as electrodes so that a current flows in an almost vertical direction between the first and the second magnetic shields; a tunnel barrier layer provided between the first and the second ferromagnetic layer; and an end region arranged to sandwich the center region from both sides for /applying a bias magnetic field to the center region.

13 Claims, 12 Drawing Sheets

U.S. PATENT DOCUMENTS

| | | | |
|---|---|---|---|
| 5,658,469 A | * 8/1997 | Jennison | 428/611 |
| 5,729,410 A | 3/1998 | Fontana, Jr. et al. | |
| 5,739,987 A | 4/1998 | Yuan et al. | |
| 5,764,567 A | 6/1998 | Parkin | |
| 5,801,984 A | 9/1998 | Parkin | |
| 5,841,692 A | * 11/1998 | Gallagher et al. | 365/173 |
| 5,862,022 A | * 1/1999 | Noguchi et al. | 360/324.2 |
| 5,892,641 A | 4/1999 | Ishiwata | |
| 5,898,547 A | 4/1999 | Fontana, Jr. et al. | |
| 5,898,548 A | 4/1999 | Dill et al. | |
| 5,901,018 A | 5/1999 | Fontana, Jr. et al. | |
| 5,923,503 A | 7/1999 | Sato et al. | |
| 5,959,810 A | 9/1999 | Kakihara et al. | |
| 5,966,012 A | 10/1999 | Parkin | |
| 5,985,162 A | * 11/1999 | Han et al. | 216/22 |
| 5,986,858 A | 11/1999 | Sato et al. | |
| 5,995,338 A | 11/1999 | Watanabe et al. | |
| 6,005,753 A | 12/1999 | Fontana, Jr. et al. | |
| 6,023,395 A | 2/2000 | Dill et al. | |
| 6,052,261 A | * 4/2000 | Watanabe et al. | 204/192.1 |
| 6,172,859 B1 | * 1/2001 | Watanabe et al. | 360/327.3 |
| 6,307,721 B1 | * 10/2001 | Chen et al. | 360/316 |
| 6,330,136 B1 | * 12/2001 | Wang et al. | 360/324.2 |
| 6,333,842 B1 | * 12/2001 | Nobuyuki et al. | 360/324.2 |
| 6,452,764 B1 | * 9/2002 | Abraham et al. | 360/324.2 |

OTHER PUBLICATIONS

J. Moodera et al., "Ferromagnetic–insulator–ferromagnetic tunneling: Spin–dependent tunneling and large magnetoresistance in trilayer junctions (invited)," Apr. 15, 1996, pp. 4724–4729, J. Appl. Phys., vol. 79.

Nikkei Electronics article, No. 686, Apr. 7, 1997.

N. Tezuka et al., "Relationship between the barrier and magnetoresistance effect in ferromagnetic tunneling junctions," 1997, pp. 493–496, 1997 Journal of Japan Applied Magnetism Society, vol. 21.

"Spin valve read head with Fe/A1203/Fe/NiFe tunneling junction," pp. 97–98, IBM Technical Disclosure Bulletin, vol. 40, No. 4, Apr. 19, 1997.

* cited by examiner

MAGNETO-RESISTANCE EFFECT TYPE COMPOSITE HEAD AND PRODUCTION METHOD THEREOF

This application is a division of Application Ser. No. 09/204,222, filed on Dec. 3, 1998, which application was refiled as an RCE on Feb. 27, 2001 and issued as U.S. Pat. No. 6,333,842, the entire contents of which are hereby incorporated by reference.

BACKGROUND OF THE INVENTION

1. Field of the Invention

The present invention relates to a thin film magnetic head used in a magnetic disc apparatus and in particular, to a magnetic recording/reproduction head using the magneto-resistance effect obtained by ferromagnetic tunnel junction.

2. Description of Related Arts

As the magnetic recording apparatus reduces its size and increases capacity, a magneto-resistance effect type head (hereinafter, referred to as an MR head) having a large reproduction output has been used in practice. Such an MR head is already described in "A Magnetoresistivity Readout Transducer", IEEE Trans. On Magn., MAG7, 1971, page 150 [1].

In order to improve the conventional MR head, there has been developed a GMR head using a giant magneto-resistance effect (hereinafter, referred to as GMR) capable of realizing a further increased reproduction output. This GMR uses the magneto-resistance effect called spin-valve effect in which a resistance change corresponds to a cosine of a magnetization direction of two adjacent magnetization layers. This enables to obtain a large resistance change with a small operation magnetic field. The MR head using the spin-valve effect is described in "Design, Fabrication & Testing of Spin-Valve Read Heads for High Density Recording", IEEE Trans. On Magn., Vol. 30, No. 6, 1994, page 3801 [2]. However, the magneto-resistance change ratio obtained by the spin-valve effect that can be applied to an actual MR head is only several percents. When reducing a track width for increasing the recording density, it is necessary to obtain a magneto-resistance effect having a greater resistance change ratio.

The ferromagnetic tunnel junction has a configuration including two ferromagnetic layers sandwiching a tunnel barrier layer made from a thin insulator body having a thickness of several nanometers. In this configuration, when a constant current flows between the ferromagnetic layers while an external magnetic field is applied into the ferromagnetic layers, a magneto-resistance effect phenomenon can be seen. That is, a resistance value is changed according to a relative angle of magnetization directions of the two magnetic layers. This is called a ferromagnetic tunnel junction magneto-resistance effect (TMR). The resistance value is minimum when the magnetization directions are parallel to each other, and maximum when the magnetization directions are anti-parallel to each other. That is, the parallel and the anti-parallel states can be obtained depending on the intensity of the magnetic field. Accordingly, it is possible to detect a magnetic field according to a change of the resistance value.

Recently, there has been developed a TMR element exhibiting a magneto-resistance change ratio near to 20% by forming an Al oxide surface film on the tunnel barrier layer. This increases the possibility to apply the TMR element to a magnetic head and a magnetic memory. An example of such a large magneto-resistance change ratio is described in "Journal of Applied Physics", Vol. 79, 1996, page 4724 to 4729 [3].

That is, using a deposition mask, a first ferromagnetic layer of CoFe is formed on a glass substrate by way of vacuum deposition. Subsequently, the deposition mask is exchanged, and an Al layer is formed to have a thickness of 1.2 to 2.0 nm. This Al surface is subjected to an oxygen glow discharge so as to form a tunnel barrier layer of $Al_2O_3$. After this, a second ferromagnetic layer of Co is formed on this tunnel barrier layer over the first ferromagnetic layer, thus completing a cross electrode type ferromagnetic tunnel element. This method enables to obtain a magneto-resistance change ratio as large as 18%.

Various TMR elements are disclosed in Japanese Patent Publication (Unexamined) No. A-5-63254 [4], Japanese Patent Publication (Unexamined) No. A-6-244477 [5], Japanese Patent Publication (Unexamined) No. A-8-70148 [6], Japanese Patent Publication (Unexamined) No. A-8-70149 [7], Japanese Patent Publication (Unexamined) No. A-8-316548 [8], and 1997 Journal of Japan Applied Magnetism Society, vol. 21, pp. 493 to 496 [9]. These documents give a description on a method in which the Al layer formed is exposed to the atmosphere for epitaxy of $Al_2O_3$.

When applying the TMR element to a device such as a magnetic head and memory, it is necessary to reduce affects from a thermal noise. In this case, it is necessary to have a sufficiently low resistance value in practical element dimensions. However, in the conventional tunnel barrier formation method, it is difficult to realize this. Moreover, in application to a magnetic head of high-density design, the signal output voltage becomes a key point. However, with the conventional technique, it is impossible to obtain a sufficiently high density without deteriorating the element characteristic. Furthermore, with the conventional technique, there has been a problem that characteristic fluctuations among elements in a wafer or between lots are too great to obtain a sufficient yield for practical use.

The aforementioned problems are considered to come from the conventional tunnel barrier layer formation method. In the method using the oxygen glow discharge, active oxygen in the radical state or ion is used for oxidation of the conductive layer and accordingly, it is difficult to control the thickness of the oxide film, i.e., element resistance. Moreover, there is a problem that the tunnel barrier layer is contaminated with activated impurities gas generated simultaneously. On the other hand, the method using natural oxidation in the atmosphere also have various problems. For example, a pin hole may be generated in the tunnel barrier layer by dusts in the atmosphere, and the tunnel barrier layer is contaminated with humidity, carbon oxide, or nitrogen oxide, similarly in the oxygen glow discharge method.

Japanese Patent Application No. 9-209292 [10] discloses a TMR element production method having a practically sufficient resistance value and signal output voltage characteristic with an improved yield. This method includes: a step for successively forming a first ferromagnetic layer, a tunnel barrier layer, and a second ferromagnetic layer; a step for forming a conductive layer of a metal or semiconductor; and a step for introducing oxygen into vacuum for natural oxidation of a surface of this conductive layer so as to form a tunnel barrier layer.

Furthermore, Document [10] discloses a TMR element production method for successively forming a first ferromagnetic layer, a tunnel barrier layer, and a second ferromagnetic layer while maintaining a vacuum. After the first ferromagnetic layer is formed, an oxygen is introduced to oxidize a surface of the first ferromagnetic layer while maintaining the vacuum, and after formation of a conductive layer of metal or semiconductor, an oxygen is introduced into the vacuum for natural oxidation of a surface of this conductive layer to form the tunnel barrier layer.

With reference to FIG. 11, explanation will be given on the TMR film production method disclosed in Document [10]. Firstly, an undercoat layer 10, a first ferromagnetic layer 11, and a conductive layer 12 are successively formed in a vacuum (FIG. 11A). A pure oxygen is introduced without breaking the vacuum, for natural oxidation of a surface of the conductive layer 12 to form a tunnel barrier layer 13 (FIG. 11B). It should be noted that FIG. 11B shows that even after the oxidation of the conductive layer, there is left an unoxidized portion on the boundary with the first ferromagnetic layer 11. It is also possible to completely oxidize the conductive layer by setting the oxidation conditions as such. After exhausting the oxygen, the second ferromagnetic layer 14 is formed to complete the basic configuration of the TMR film (FIG. 11C). Next, an antiferromagnetic layer 15 is formed to complete the basic configuration of the TMR element (FIG. 11D).

In the aforementioned method, it is possible to obtain an epitaxy of an oxide layer while maintaining a thermal equilibrium in a clean atmosphere not affected by a gas from impurities, thus enabling to control to form a high-quality tunnel barrier layer. Moreover, by controlling the oxygen pressure and the substrate temperature, it is possible to obtain an element of a low resistance and a high current density required for application to a device such as a magnetic head. Furthermore, it is possible to obtain a uniform element characteristic within a wafer and stable repeatability between lots. When the ferromagnetic layer contains Fe, Co, Ni or an alloy containing them and if the conductive layer is made from an Al material having a surface free energy smaller than that of the ferromagnetic layer, it is possible to obtain a preferable coating with respect to the first ferromagnetic layer serving as an undercoat layer. As a result, in an element completed, it is possible to obtain a preferable characteristic having no electrical short-circuit between the ferromagnetic layers due to a pin hole. Moreover, the free energy required for oxidation of Al per one oxygen atom is greater than Fe, Co, Ni, and accordingly, the $Al_2O_3$ serving as the tunnel barrier is thermally stabilized on the junction boundary. When Mg or a metal of lanthanoid is selected for the conductive layer, it is possible, from the same reason, to obtain a preferable coating characteristic with respect to the first ferromagnetic layer serving as the undercoat as well as to obtain a thermally stable tunnel barrier.

Referring to FIG. 12, explanation will be given on the conventional TMR element production method disclosed in Document [10]. After formation of the first ferromagnetic layer 11 (FIG. 12A), oxygen is introduced into the vacuum for forming an oxide layer 21 on the surface of the first ferromagnetic layer 11 (FIG. 12B). When forming the conductive layer 12 in the next step, oxygen is diffused from the first ferromagnetic layer 11 into the conductive layer 12 (FIG. 12C), and an oxide layer 23 is also formed at the side of the conductive layer 12. In this method, the oxide layer 24 of the conductive layer 12 is formed on both boundaries in contact with the ferromagnetic layers, enabling to exhibit an excellent thermal stability. After exhausting the oxygen, the second ferromagnetic layer 14 is formed (FIG. 12E) and the antiferromagnetic layer 15 is formed to complete the basic configuration of the TMR element (FIG. 12F). In order to form a stable oxide layer at the side of the conductive layer 12, the conductive layer 12 should have a greater free energy for oxidization per one oxygen atom than an element constituting the ferromagnetic layer 11. When the ferromagnetic layer contains Fe, Co, Ni, or an alloy containing them, it is effective that the conductive layer 12 uses Al, Mg, or a metal belonging to lanthanoid.

FIG. 10 shows a configuration example of an air bearing surface (ABS) of a magnetic head using the conventional TMR element which is described in "Nikkei Electronics", No. 686, Apr. 7, 1997 [11]. The TMR element including a TMR film having electrodes formed at its ends is contained through an insulation film in a magnetic shield.

In the apparatus having the configuration shown in FIG. 10, the TMR element 119 including upper and lower electrode films 118 is present between the magnetic shields which determine the resolution of a reproduction head. Accordingly, it is possible to reduce the distance between the shields while maintaining a sufficient insulation between the TMR element and the upper and lower magnetic shields. However, it is difficult to prepare a thin insulation film and it is impossible to reduce the distance between the magnetic shields smaller than the thickness of the TMR element. Furthermore, for reducing the track width, the electrodes (right and left) need be patterned on the top and bottom of the TMR film so as to make the distance between the electrodes in the order of submicrons, which is quite difficult in the process using a photo-resist. Furthermore, to cope with a noise increase caused by reduction in size of the TMR element, it is necessary to apply a certain bias magnetic field.

SUMMARY OF THE INVENTION

It is therefore an object of the present invention to provide a recording/reproduction head using a TMR element for a high-density recording and reproduction that enables to realize a high resolution for a high line density and to reduce a track width for a high track density, and a production method thereof.

The magneto-resistance effect type composite head according to the present invention comprises: a first magnetic shield and a second magnetic shield successively layered on a slider; a reproduction head including a magneto-resistance effect element (hereinafter, referred to as an MR element) arranged between the first and the second magnetic shields; and a recording head arranged adjacent to the reproduction head so as to use the second magnetic shield as a first magnetic pole film and having a second magnetic pole film opposing to the first magnetic pole via a magnetic gap;

the MR element comprising:
a center region including a ferromagnetic tunnel junction magneto-resistance effect film (hereinafter, referred to as a TMR film) having: a first ferromagnetic layer and a second ferromagnetic layer for generating a magneto-resistance effect using the first and the second magnetic shields as electrodes so that a current flows in a an almost vertical direction between the first and the second magnetic shields; and a tunnel barrier layer provided between the first and the second ferromagnetic layer; and
an end region arranged to sandwich the center region from both sides for applying a bias magnetic field to the center region.

Moreover, the magneto-resistance effect composite head production method according to the present invention comprises steps of: forming a first magnetic shield on a slider; forming a ferromagnetic tunnel junction magneto-resistance effect (hereinafter, referred to as TMR) element having a center region constituted by a TMR film and an end region for applying a bias magnetic field to the TMR film; and forming a second magnetic shield;

the TMR element forming step including steps of: forming the TMR film, forming a photo-resist mask on the TMR film, patterning the TMR film by the photo-resist mask, and lifting-off the end region by the photo-resist mask.

According to another aspect of the magneto-resistance effect type composite head production method according to the present invention, after the TMR film forming step, there is a step for forming an insulation film arranged to cover the TMR element and patterned to determine a reproduction track width in the center region.

DESCRIPTION OF THE PREFERRED EMBODIMENTS

Description will now be directed to embodiments of the present invention with reference to the attached drawings.

Embodiment 1

Figure 1:
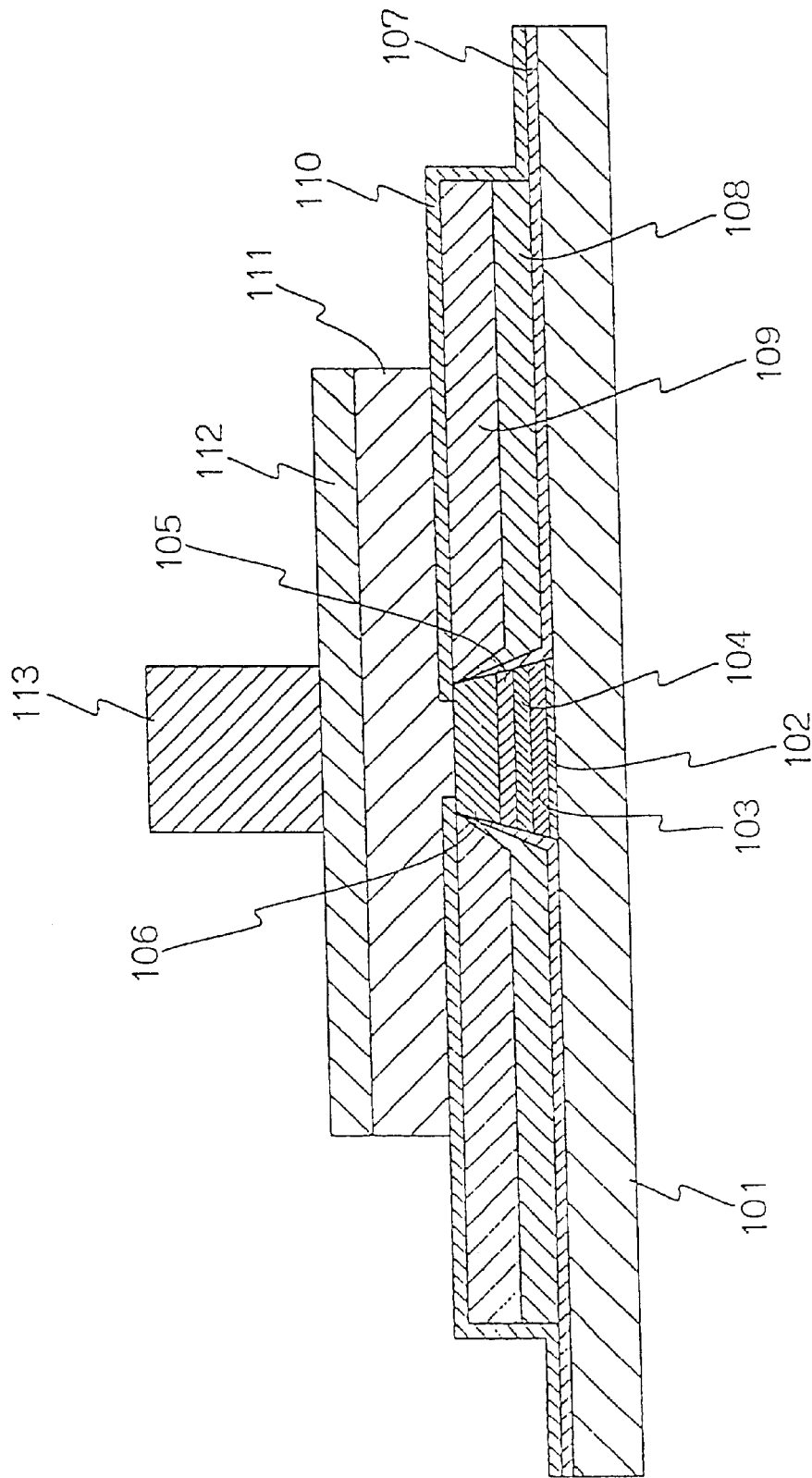
FIG. 1 shows a layered configuration of a magneto-resistance effect (MR) composite head according to a first embodiment of the present invention.

FIG. 1 shows a layered configuration of a magneto-resistance effect type composite head according to a first embodiment of the present invention viewed from a surface (air baring surface, hereinafter referred to as an ABS surface) opposing to a medium. This head includes a head for a reproduction function made from two magnetic shields 101 and 111 successively layered on a slider, and a TMR element provided between the two magnetic shields 101 and 111. Furthermore, the head includes a head for a recording function. One of the magnetic shields, i.e., 111 also serves as one magnetic pole film 111. On this magnetic pole film 111, i.e., on the side not having the magneto-resistance effect element, there are successively layered a coil sandwiched by insulation bodies and another magnetic pole 113. A magnetic gap 112 is provided between the magnetic poles 111 and 113. A magnetic field generated in this magnetic gap 112 enables recording.

The aforementioned composite head is prepared as follows. Firstly, from the side of the lower shield 101, a Ta film 102 with a thickness of 30 nm, a first ferromagnetic layer 103 made from a Ni—Fe film with a thickness of 10 nm, and a conductive layer of Al film with a thickness of 10 nm were successively formed in this order by way of sputter deposition. After this, a surface of the Al conductive layer was oxidized to form a tunnel barrier layer 104. Next, a second ferromagnetic layer 105 of Co—Fe film and an antiferromagnetic film 106 of Ni—Mn film with a thickness of 20 nm were formed by way of sputter deposition, thus completing a TMR film. After formation of the TMR film, sputter deposition was carried out to form a non-magnetic insulation layer 107 made from alumina, a permanent magnet layer 108 made from CoCrPt, and a non-magnetic layer 109 made from Ta. With this configuration, the end surface of the TMR film patterned is coated by the non-magnetic layer before formation of the permanent magnet layer. Accordingly, there was no danger of electrical short-circuit between the two magnetic layers facing to each other via the tunnel barrier layer of the TMR film, thus enabling to maintain a preferable TMR characteristic. Furthermore, the insulation layer 110 was formed by way of sputter deposition and the upper shield 111 was formed as a Ni—Fe film with a thickness of 3 micrometers by way of frame plating. The magnetic gap 112 was formed using alumina. Subsequently, a Cu coil was formed by way of the frame plating method. Furthermore, the upper magnetic pole 113 for the recording function was formed as a Ni—Fe film with a thickness of 4 micrometers by way of the frame plating method.

A TMR element includes a center region made from a ferromagnetic TMR film and an end region layered so as to sandwich this center region from right and left. The center region has the tunnel barrier layer sandwiched between the first and the second ferromagnetic layers for generating a magneto-resistance effect with a current flowing almost in a vertical direction between the magnetic shields 101 and 111 serving as electrodes.

The aforementioned configuration enables to apply a bias magnetic field to the TMR element. This enables to realize a high resolution and a high track density with a reduced track width.

Hereinafter, description will be directed to a production procedure of the head according to the first embodiment. A wafer substrate constituting a slider is made from a composite ceramic of $Al_2O_3$—TiC. On this wafer substrate, a CoTaZr film was formed with a thickness of 1 micrometer by way of the sputtering and patterned as the lower shield 101. During formation of this CoTaZr film, a uni-directional magnetic field was applied in a horizontal direction in FIG. 1. After this, a uni-directional magnetic field of 500 Oe was applied to this magnetic anisotropic direction while an initial thermal treatment was carried out at a temperature of 350 degrees C. for 1 hour.

Next, the TMR film to become the center region was formed by way of the sputtering method as follows. Firstly, from the side of the lower shield (101), the Ta film (102) with thickness of 30 nm, the first ferromagnetic layer (103) with a thickness of 10 nm, and a conductive layer of Al film with a thickness of 2 nm were successively formed in this order by way of the sputter deposition. This film formation was carried out by using a high frequency magnetron sputter apparatus having four 4-inch targets. The sputter condition was set to a background pressure of $1 \times 10^{-7}$ Torr or below, Ar pressure of 10 mTorr, and a high frequency power of 200 W. Next, a pure oxygen was introduced into the sputter apparatus with an oxygen pressure maintained in a range of 20 mTorr to 200 Torr for 10 minutes for oxidizing the surface of the Al conductive layer so as to form the tunnel barrier layer (104). After the oxygen was exhausted to reach the background pressure, the sputter deposition was employed to form the second ferromagnetic layer (105) made from a Co—Fe film with a thickness of 20 nm and an antiferromagnetic layer made from a Ni—Mn film with a thickness of 20 nm, thus completing the TMR film.

After this, in order to generate an exchange interaction magnetic field between the second ferromagnetic layer 105 and the antiferromagnetic layer 106 so as to fix the magnetization of the second ferromagnetic layer 105 in a direction vertical to the ABS surface in FIG. 1, a uni-directional magnetic field of 30 kOe was applied in vertical direction to the ABS surface while carrying out a thermal treatment at 270 degrees C. for 5 hours. This magnetic field had a direction vertically intersecting the direction of the magnetic field applied when the lower shield was subjected to the thermal treatment. The lower shield of CoTaZr film had been thermally treated at 350 degrees C. and its axis of easy magnetization would not be changed by the thermal treatment this time and maintained the anisotropic magnetic field Hk of 80 e, sufficient for a magnetic shield. Next, patterning of the TMR film was carried out to form the center region, which was followed by formation of the end region.

Embodiment 2

Figure 2:
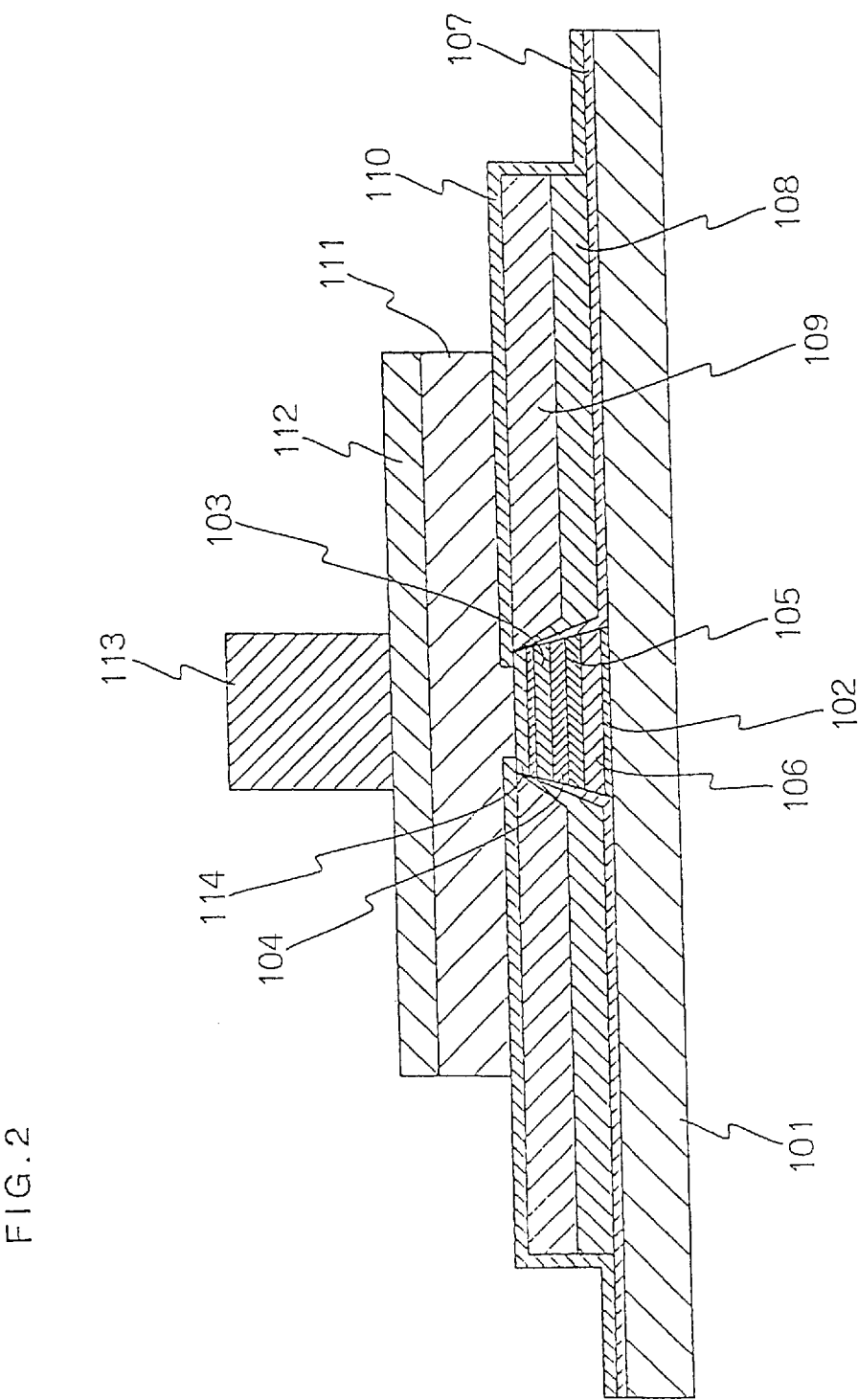
FIG. 2 shows a layered configuration of a magneto-resistance effect (MR) composite head according to a second embodiment of the present invention.

FIG. 2 shows a layered configuration of a magneto-resistance effect type composite head according to a second embodiment of the present invention viewed from the ABS surface opposing to a medium. The TMR film is constituted by an undercoat layer 102, an antiferromagnetic layer 106, a first ferromagnetic layer 105, a tunnel barrier layer 104, a second ferromagnetic layer 103, and a non-magnetic conductive layer 114. The TMR film according to the second embodiment has a configuration different from that of the first embodiment. The TMR film according to the second embodiment was constituted by following layers successively formed in this order from the side of the lower shield 101, employing a continuous sputter deposition: a Ta film 102 with a thickness of 30 nm, an antiferromagnetic layer 106 of Pt—Mn film with a thickness of 20 nm; a first magnetic layer 105 made from a Co film with a thickness of 20 nm; and a conductive layer of Al film with a thickness of 2 nm. The Al conductive layer constituting the tunnel barrier layer 104 was formed using the sputter apparatus used in Embodiment 1 with the same sputtering conditions as in Embodiment 1. Oxygen was exhausted to reach the background pressure before successively forming by way of sputter deposition a second ferromagnetic layer 103 of a Ni—Fe—Co film with a thickness of 10 nm and a non-magnetic conductive layer 114 of Ta film with a thickness of 30 nm, thus completing the TMR film. After this, magnetization of the second ferromagnetic layer 114 was fixed in the vertical direction to the ABS surface using the same procedure and conditions as in Embodiment 1. Thus, the second embodiment is identical to the first embodiment except for the configuration of the TMR film and can exhibit the same effect as the first embodiment.

Embodiment 3

Figure 3:
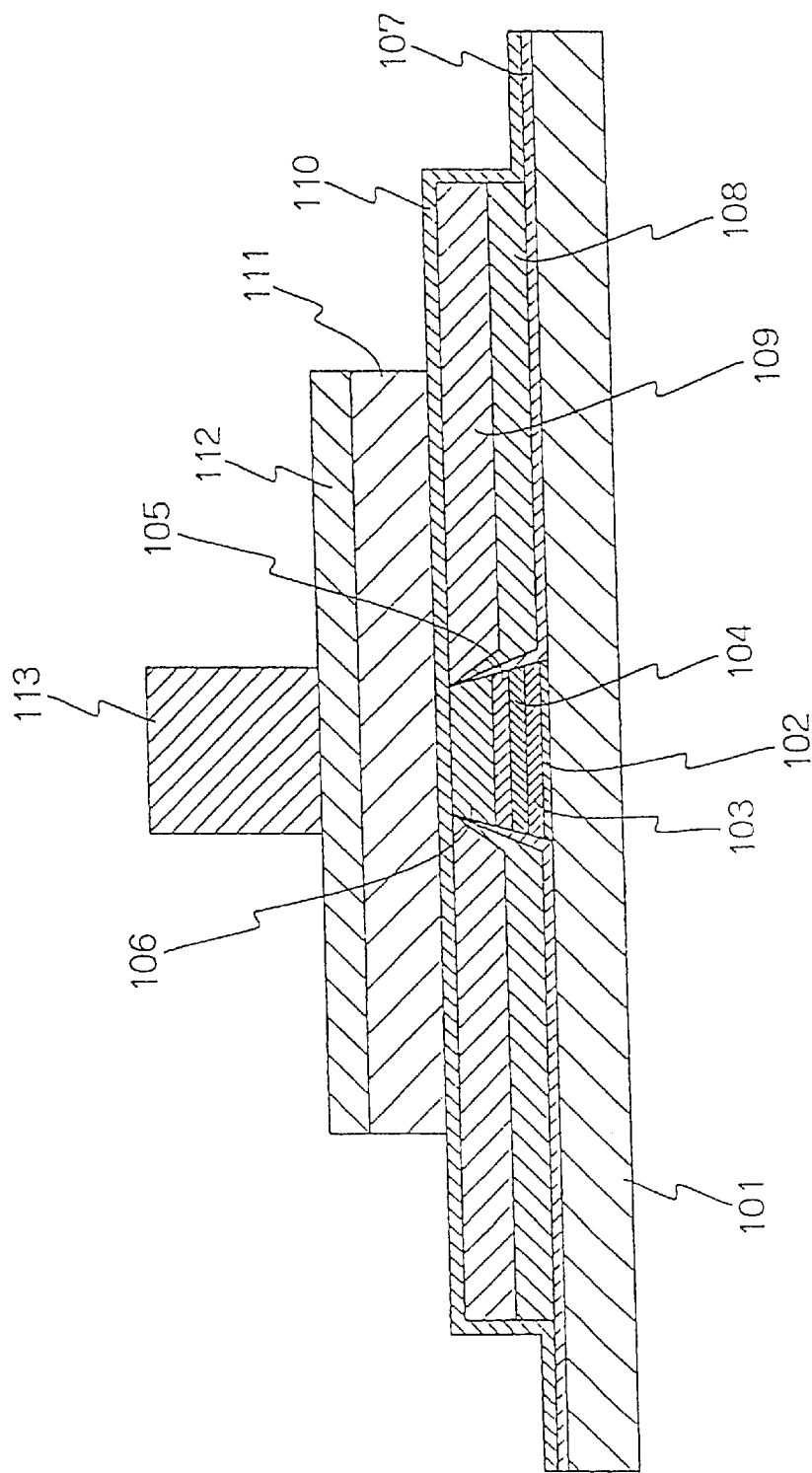
FIG. 3 shows a layered configuration of a magneto-resistance effect (MR) composite head according to a third embodiment of the present invention.

FIG. 3 shows a layered configuration of a magneto-resistance effect type composite head according to a third embodiment of the present invention viewed from the ABS surface opposing to a medium. The TMR film is constituted by an undercoat layer 102, a first ferromagnetic layer 103, a tunnel barrier layer 104, a second ferromagnetic layer 105, and an antiferromagnetic layer 106. The third embodiment differs from the first embodiment in that the junction between the TMR film and the upper shield 111 is not exposed to the ABS surface. This can be obtained by designing the mask which determines the track width of the TMR film when carrying out the lift-off of the insulation film 110, in such a manner that the end face of the TMR film is arranged at a deeper position with respect to the ABS surface. The distance between the TMR end face to the ABS surface was set to a range from 0.1 to 1 micrometer. The third embodiment is identical to the first embodiment except for the configuration of the TMR film and can exhibit the same effects as the first embodiment.

Evaluation of Embodiments 1 to 3

The TMR elements according to the first, the second, and the third embodiments were respectively cut off from the wafers and processed into a slider configuration for a magnetic disc, and then mounted on an arm having a gimbal spring for recording/reproduction evaluation. Here, the permanent magnet was magnetized with a magnetic field of 3 kOe. The magneto-resistance change ratio actually obtained was about 15%. The magneto-resistance change ratio did not change at all up to $10^3$ A/cm$^2$ while increasing the current density. At $5 \times 10^3$ A/cm$^2$, the resistance value stayed almost unchanged and the magneto-resistance change ratio decreased only by about 10%. The signal output voltage of the TMR head according to the first and the second embodiment was about 1 mV with a current density of $10^3$ A/cm$^2$ and about 3 mV with a current density of $5 \times 10^3$ A/cm$^2$. The signal output voltage of the TMR head according to the third embodiment was about 2 mV with a current density of $5 \times 10^3$ A/cm$^2$. When used for a reproduction magnetic head, the TMR element according to the first embodiment can cope with a recording density of 3 Gb/in$^2$ or above, and the TMR element according to the second embodiment can cope with a recording density of 30 Gb/in$^2$ or above. In the third embodiment, the junction between the TMR film and the upper shield 111 is arranged at a deeper position with respect to the ABS surface. Accordingly, even when the ABS surface was in contact with a medium surface, no noise was caused by a heat dissipation due to a contact, enabling to obtain a stable operation without a noise.

Embodiment 4

Figure 4:
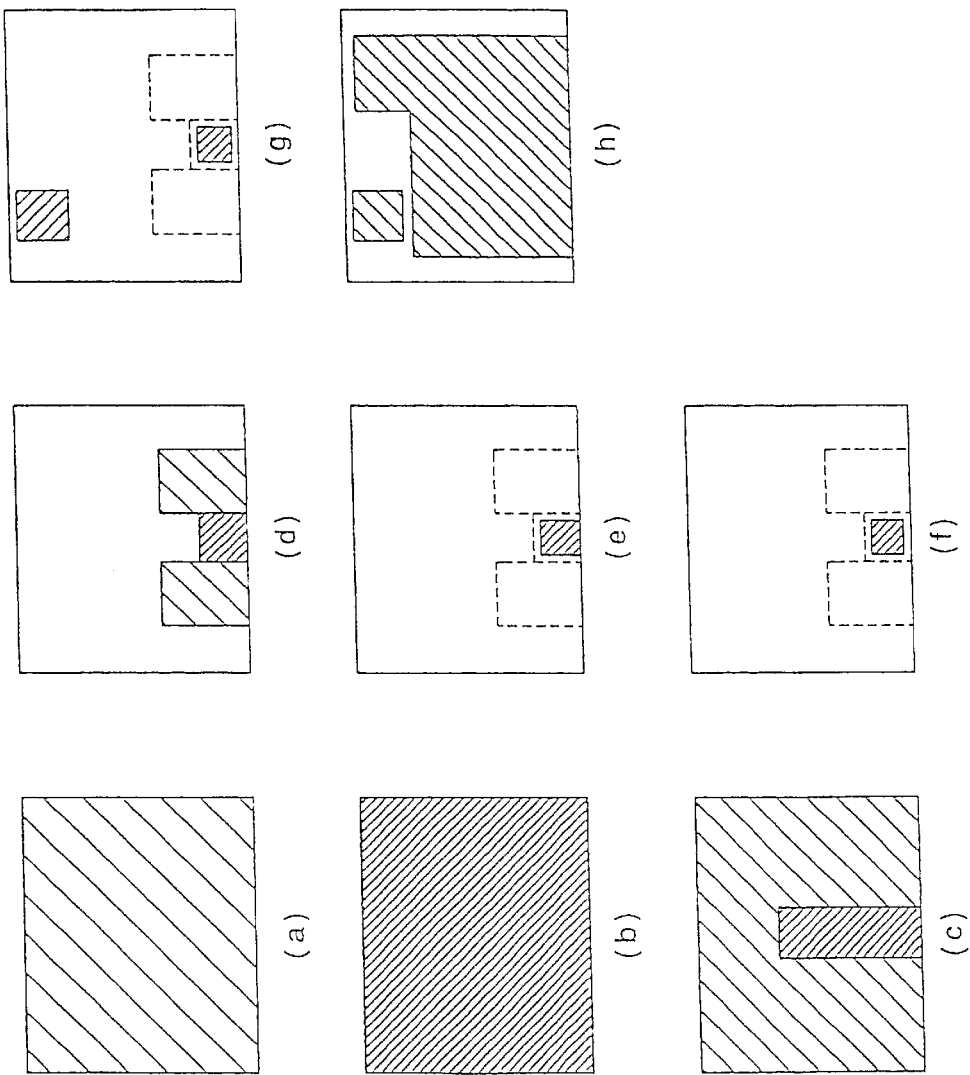
FIG. 4 shows a production procedure of the magneto-resistance effect (MR) composite head according to the first embodiment of the present invention, including steps of forming a lower shield (A); undercoat/TMR film (B); TMR patterning (insulation/PM/non-magnetic insulation film formation) (C); element patterning (leaving the insulation film)(D); resist pattern formation for insulation film lift-off (E); an insulation film lift-off (F); forming a hole in the insulation film (G); and a shield formation (H).

FIG. 4 shows a production procedure of the TMR film of the aforementioned magneto-resistance effect type composite head according to the first embodiment. On a wafer substrate made from a composite ceramic of $Al_2O_3$—TiC constituting a slider, a FeTaN film was formed by sputtering so as to have a thickness of 1 micrometer, which was patterned as the lower shield 101 (FIG. 4A) and subjected to a thermal treatment at a temperature of 500 degrees C. in a vacuum for 1 hour. During this thermal treatment, a uni-directional magnetic field was applied in the horizontal direction in FIG. 4.

Next, a TMR film was formed to constitute the center region by sputtering (FIG. 4B). Firstly, the lower shield 101 was covered with a Ta film 102 with a thickness of 30 nm, a first ferromagnetic layer 103 made from a Ni—Fe film with a thickness of 10 nm, and a conductive layer of an Al film with a thickness of 2 nm successively formed by sputter deposition in this order. This film formation was carried out using a high-frequency magnetron sputter apparatus having four 4-inch targets. The sputtering condition was set as follows: the background pressure $1 \times 10^{-7}$ Torr or below, Ar pressure 10 mTorr, high frequency power 200 W. Next, pure oxygen was introduced into the sputter apparatus and the oxygen pressure was maintained in a range from 20 mTorr to 200 Torr for 10 minutes for oxidizing the surface of the Al conductive layer to form the tunnel barrier layer 104. After the oxygen was exhausted to reach the background pressure, a second ferromagnetic layer 105 of a Co—Fe film with a thickness of 20 nm and an antiferromagnetic film of Ni—Mn film with a thickness of 20 nm were formed by way of sputter deposition, thus completing the TMR film.

The TMR film was patterned to form the center region. After this, an insulation film, a permanent magnet film (PM), and a non-magnetic film were formed as an end region to sandwich the center region, and lift-off was carried out (FIG. 4C). An element constituted by the center region and the end region was patterned (FIG. 4 D). The insulation film was subjected to lift-off so as to determine the track width of the TMR film (FIGS. 4E and 4F).

Figure 8:
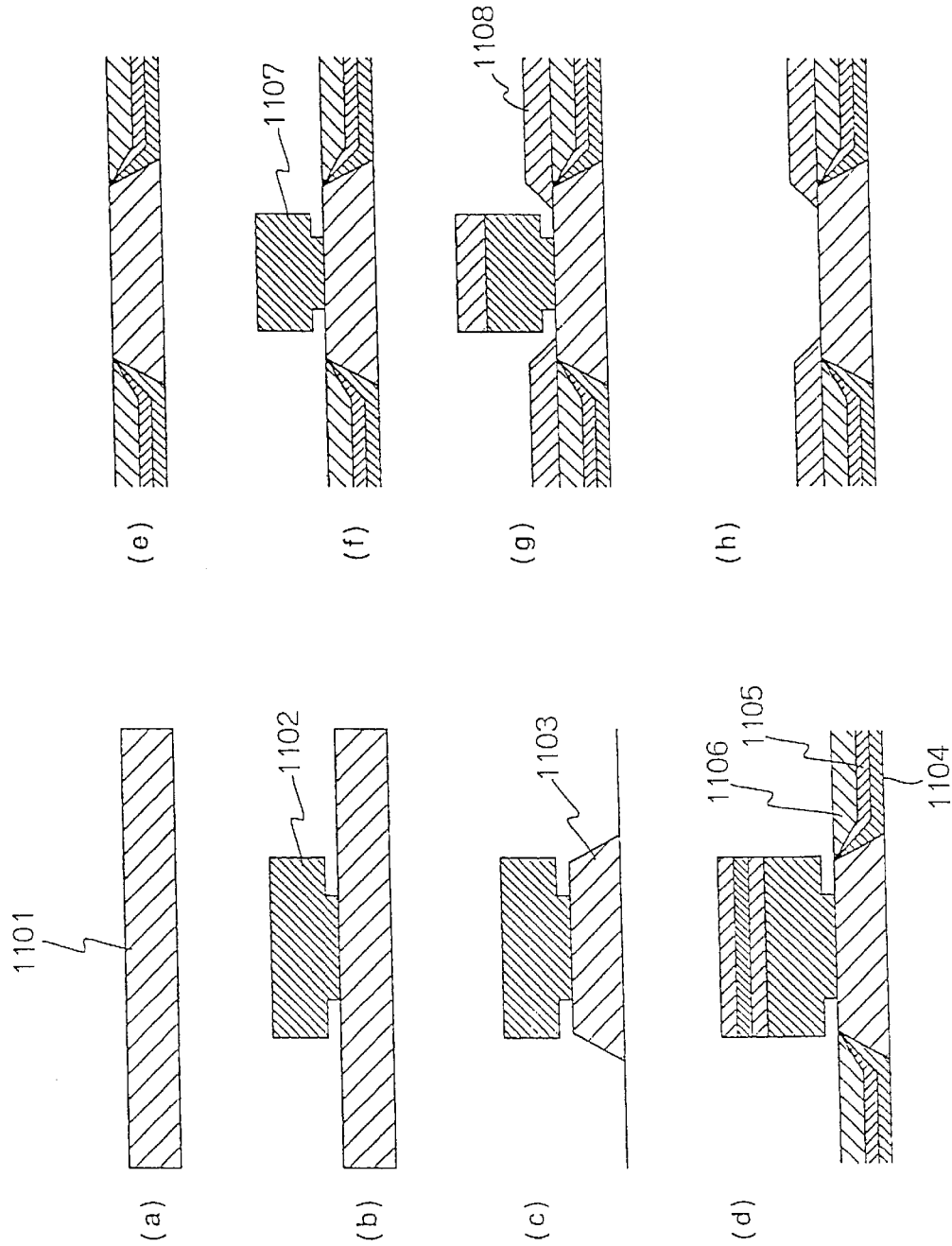
FIG. 8 shows a magneto-resistance effect (MR) composite head production procedure according to an embodiment of the present invention.

FIG. 8 shows a patterning procedure carried out after the TMR film was layered. The TMR film was formed by the method shown in FIG. 4 (FIG. 8A); a photo-resist mask 1102 was formed (FIG. 8B); and the patterning was carried out using an ion beam (FIG. 8C).

With this photo-resist mask left, sputter deposition was carried out to form a non-magnetic insulation layer 1104 of alumina, a permanent magnet layer 1105 of CoCrPt, and a non-magnetic layer 1106 of Ta (FIG. 8D), and them lift-off was carried out (FIG. 8E). According to this method, the end face of the TMR film patterned is covered with the non-magnetic insulation layer before the permanent magnet layer is formed. Accordingly, no electrical short-circuit is caused between the two magnetic layers facing to each other via the tunnel barrier layer of the TMR film, enabling to maintain a preferable TMR characteristic.

Furthermore, another photo-resist mask 1107 was formed having a width identical to or narrower than the photo-resist mask 1102 (FIG. 8F); an insulation layer 1108 was formed by sputtering (FIG. 8G); and lift-off was carried out (FIG. 8H). After this, a hole was formed through the insulation film to use a part of the lower shield as an electrode (FIG. 4G). Furthermore, an upper shield of Ni—Fe film was formed with a thickness of 3 micrometers by way of the frame plating method (FIG. 4H).

After this, a magnetic gap was formed from alumina, and a coil for generating a recording magnetic field was formed. This coil was sandwiched by a photo-resist from its top and bottom for insulation. Firstly, a photo-resist pattern serving as the lower insulator was formed on the alumina magnetic gap and thermally hardened at 260 degrees C. for 1 hour. Next, the frame plating method was used to form a Cu coil, and a photo-resist pattern serving as the upper insulator was formed. This photo-resist pattern was also thermally hardened at 260 degrees C. for 1 hour. Furthermore, a Ni—Fe film with a thickness of 4 micrometers was formed by way of the frame plating method so as to constitute an upper magnetic pole of the recording head. After formation of this upper magnetic pole, a magnetic field of 1 kOe was applied in the direction of the axis of easy magnetization of the magnetic shield, and a thermal treatment was carried out at 200 degrees C. for 1 hour. This stabilized the magnetic anisotropy of the upper magnetic pole. Next, an electrode pattern was formed for the reproduction block and the recording block before the entire element was protected by an alumina sputter film. After this, in order align the magnetization of the antiferromagnetic layer and the adjacent ferromagnetic layer, a uni-directional magnetic field of 3 kOe was applied in the vertical direction to the ABS surface while thermal treatment was carried out at 250 degrees C. for 1 hour.

Figure 11:
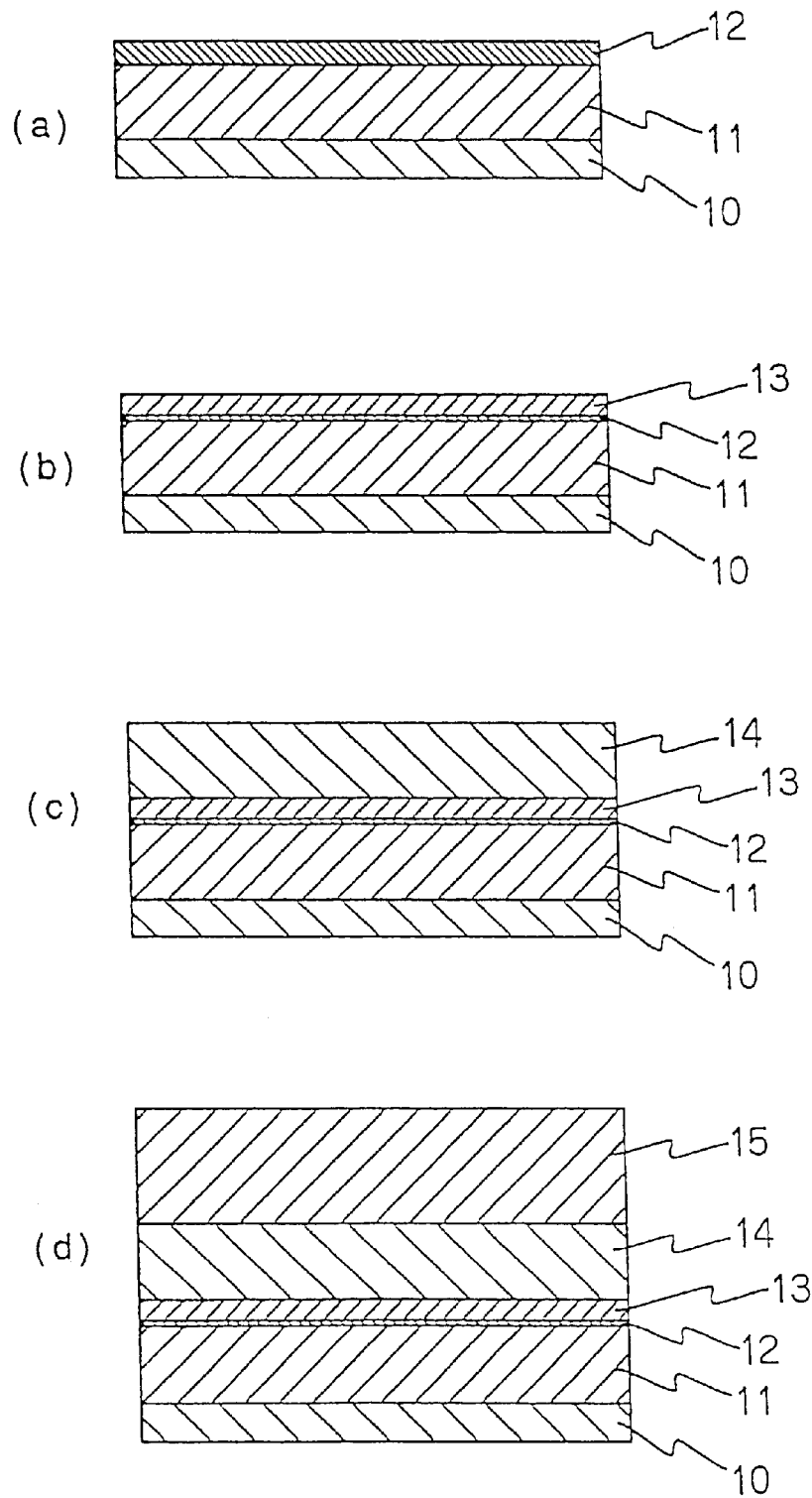
FIG. 11 shows a production procedure of a conventional MR composite head using a conventional ferromagnetic tunneling film.

FIG. 11 shows a conventional production method which can also be used to form the TMR film of the magneto-resistance effect composite head according to the first embodiment. According to the present embodiment, an undercoat layer 10 of FIG. 11 is formed from Ta, a first ferromagnetic layer 11 is formed from Ni—Fe, and a conductive layer 12 is formed from Al (FIG. 11A). Oxygen is introduced into a vacuum for natural oxidization of the surface of the conductive layer 12 so as to form a tunnel barrier 13 (FIG. 11B). Next, a second ferromagnetic layer 14 is formed from Co—Fe (FIG. 11C); and an antiferromagnetic layer 15 is formed from Ni—Mn (FIG. 11D), thus completing a TMR element. The other production steps and processing conditions are identical to the conventional production method. In the present embodiment, the oxidized layer can grow in a thermal equilibrium in a clean atmosphere not affected by impurities gas, enabling to form a high-quality tunnel barrier layer under control. Moreover, the oxygen pressure and the substrate temperature can be controlled so as to obtain an element having a necessary resistance value and a high current density. Furthermore, it is possible to obtain a uniform element characteristic in a wafer and between lots.

Figure 12:
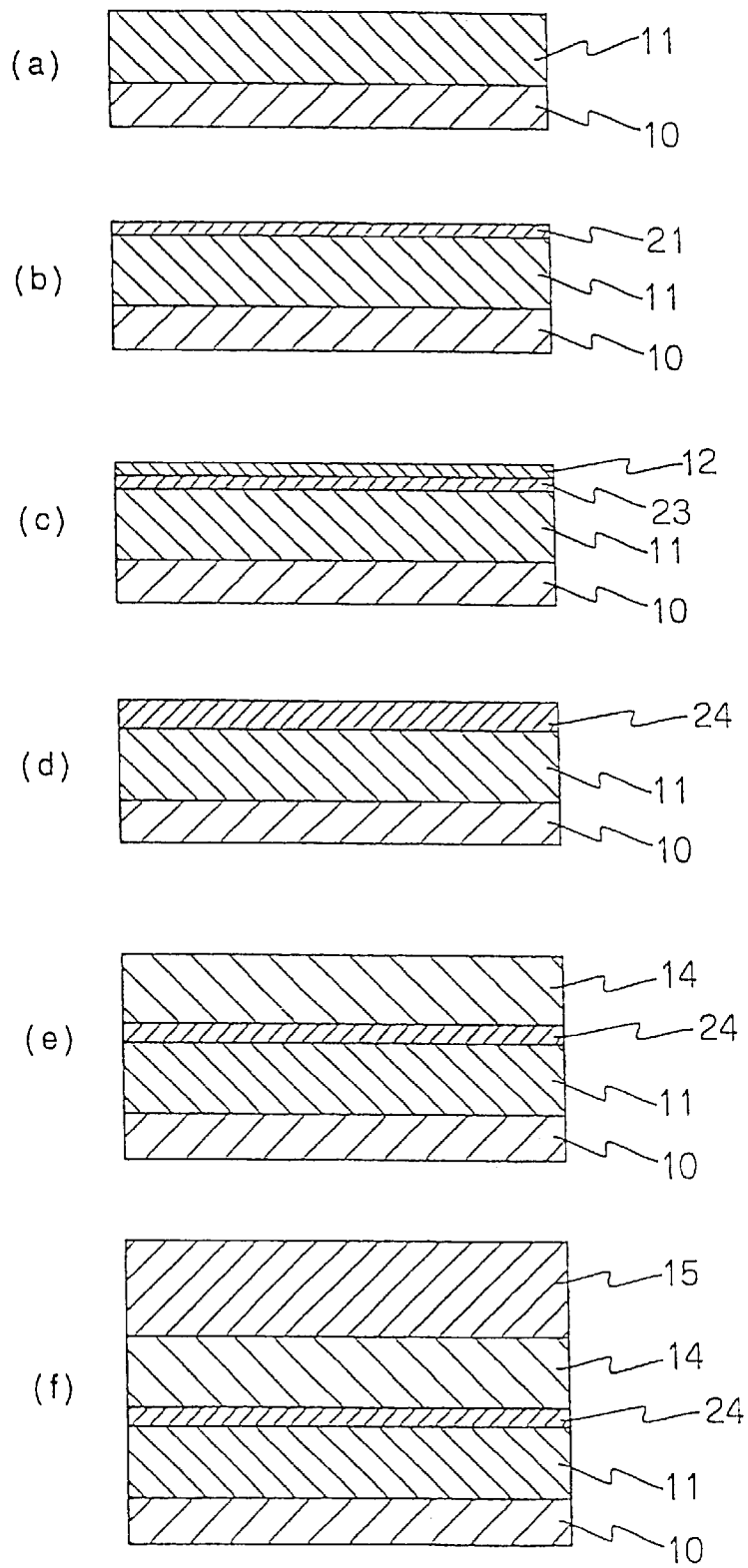
FIG. 12 shows a production procedure of a conventional MR composite head using a conventional ferromagnetic tunneling film.

FIG. 12 shows another conventional production method which can also be employed to form the TMR film of the magneto-resistance effect composite head according to the first embodiment. The undercoat layer 10 of FIG. 12 is formed from Ta, and the first ferromagnetic layer 11 is formed from Ni—Fe (FIG. 12A). After this, oxygen is introduced into a vacuum to form an oxidized layer 21 on the surface of the first ferromagnetic layer 11 (FIG. 12B). In the next step, the Al film 12 is formed as a conductive layer, during which oxygen is diffused from the first ferromagnetic layer 11 into the conductive layer 12, thus obtaining an oxidized layer 23 at the side of the conductive layer 12 (FIG. 12C). After formation of the conductive layer 12, the vacuum is maintained while pure oxygen is introduced, so that on the surface of the conductive layer 12 oxidized naturally, a tunnel barrier layer 24 is formed in combination with the layer oxidized by the oxygen diffusion from the rear side (FIG. 12D). In this method, the oxidized layer 24 of the conductive layer 12 is formed on the both boundaries with the ferromagnetic layer. This enables to obtain an element having a further thermally stable characteristic. After the oxygen is exhausted, the second ferromagnetic layer 14 is formed from Ci—Fe (FIG. 12E), and the antiferromagnetic layer 15 is formed from Ni—Mn, thus completing the basic configuration of the MR element (FIG. 12F). The TMR film thus obtained exhibits characteristics similar to the TMR film obtained according to the fourth embodiment.

The elements thus obtained were cut off from the wafer and processed into a slider configuration for a magnetic disc and mounted on a arm having a gimbal spring for evaluation of recording/reproduction characteristics. The elements exhibited similar results as those obtained by the first, the second, and the third embodiments.

Embodiment 5

Figure 5:
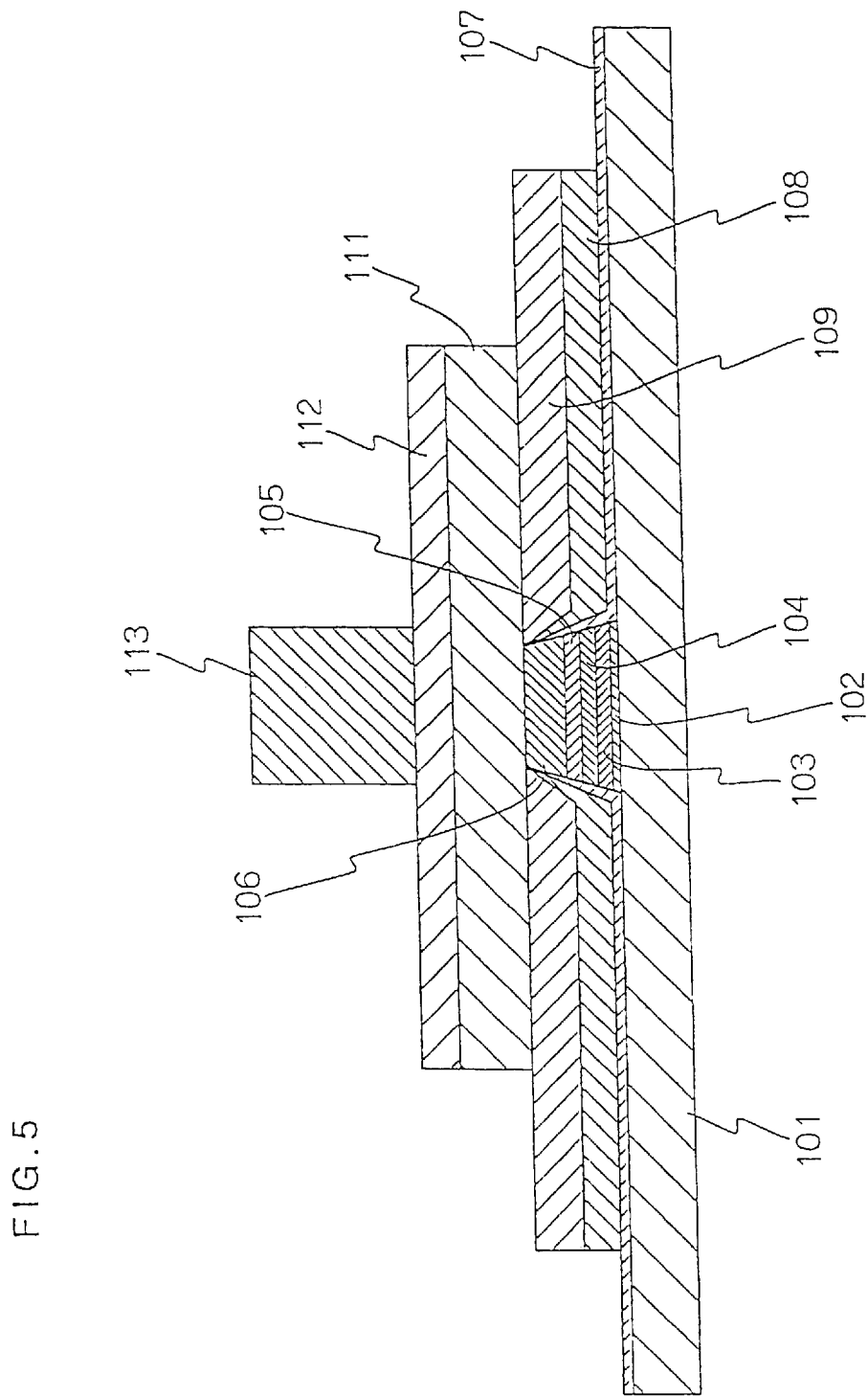
FIG. 5 shows a layered configuration of a magneto-resistance effect (MR) composite head according to a fifth embodiment of the present invention.

FIG. 5 shows a layered configuration of a magneto-resistance effect composite head apparatus according to a fifth embodiment of the present invention viewed from the ABS surface. The magneto-resistance effect composite head apparatus according to the fifth embodiment differs from that of the first embodiment in that the insulation layer 110 is absent between the non-magnetic layer 109 and the upper shield serving also as electrode 111.

The aforementioned magneto-resistance effect composite head was prepared as follows. A wafer substrate constituting a slider is made from a composite ceramic of $Al_2O_3$—TiC. On this wafer substrate, a CoMoZr film was formed with a thickness of 1 micrometer by way of the sputtering and patterned as the lower shield 101. During formation of this CoMoZr film, a uni-directional magnetic field was applied in a horizontal direction in FIG. 5. After this, a uni-directional magnetic field of 500 Oe was applied to this magnetic anisotropic direction while an initial thermal treatment was carried out at a temperature of 350 degrees C. for 1 hour.

Next, the TMR film to become the center region was formed by way of the sputtering method as follows. Firstly, from the side of the lower shield (101), the Ta film (102) with thickness of 30 nm, the first ferromagnetic layer (103) with a thickness of 10 nm, and a conductive layer of Al film with a thickness of 2 nm were successively formed in this order by way of the sputter deposition. This film formation was carried out by using a high frequency magnetron sputter apparatus having four 4-inch targets. The sputter condition was set to a background pressure of $1 \times 10^{-7}$ Torr or below, Ar pressure of 10 mTorr, and a high frequency power of 200 W. Next, a pure oxygen was introduced into the sputter apparatus with an oxygen pressure maintained in a range of 20 mTorr to 200 Torr for 10 minutes for oxidizing the surface of the Al conductive layer so as to form the tunnel barrier layer (104). After the oxygen was exhausted to reach the background pressure, the sputter deposition was employed to form the second ferromagnetic layer (105) made from a Co—Fe film with a thickness of 20 nm and an antiferromagnetic layer 106 made from a Ni—Mn film with a thickness of 20 nm, thus completing the TMR film.

After this, in order to generate an exchange interaction magnetic field between the second ferromagnetic layer 105 and the antiferromagnetic layer 106 so as to fix the magnetization of the second ferromagnetic layer 105 in a direction vertical to the ABS surface in FIG. 5, a uni-directional magnetic field of 30 kOe was applied in vertical direction to the ABS surface while carrying out a thermal treatment at 270 degrees C. for 5 hours. This magnetic field had a direction vertically intersecting the direction of the magnetic field applied when the lower shield was subjected to the thermal treatment. The lower shield of CoMoZr film had been thermally treated at 350 degrees C. and its axis of easy magnetization would not be changed by the thermal treatment this time and maintained the anisotropic magnetic field Hk of 8Oe, sufficient for a magnetic shield. Next, patterning of the TMR film was carried out to form the center region, which was followed by formation of the end region as follows. A non-magnetic insulation layer 107 of alumina, a permanent magnet layer 109 of CoCrPt, and a non-magnetic layer 109 of Ta were formed by way of sputter deposition. According to this method, the end face of the TMR film patterned was coated with the non-magnetic layer before formation of the permanent magnet layer. Accordingly, there was no danger of an electrical short-circuit between the two magnetic layers facing to each other via the tunnel barrier layer of the TMR film, enabling to maintain a preferable TMR characteristic.

Referring to FIG. 5, the subsequent procedure will be explained. Using the frame plating method, a Ni—Fe film with a thickness of 3 micrometers was formed to constitute the upper shield 111, and a magnetic gap 112 was formed from alumina. After this, a coil for generating a recording magnetic field was formed. This coil was sandwiched by a photo-resist from the top and bottom as follows. Firstly, on the aforementioned alumina magnetic gap, a photo-resist pattern was formed to constitute the lower insulator and thermally hardened at a temperature of 260 degrees C. for 1 hour. Next, the frame plating method was used to form a Cu coil, and a photo-resist pattern constituting the upper insulator was formed, which was thermally hardened at a temperature of 260 degrees C. for 1 hour.

Next, a Ni—Fe film with a thickness of 4 micrometers was formed by way of the frame plating method so as to constitute the upper magnetic pole 113 of the recording head. After formation of the upper magnetic pole, a magnetic field of 1 kOe was applied in the direction of the axis of easy magnetization of the magnetic shield and thermal treatment was carried out at a temperature of 200 degrees C. for 1 hour. This stabilized the magnetic anisotropy of the upper magnetic pole. After formation of the electrode pattern for the reproduction block and the recording block, the entire element was protected by an alumina sputter film. After this, in order to align magnetization of the antiferromagnetic layer 106 and the adjacent ferromagnetic layer 105, a uni-directional magnetic field of 3 kOe was applied in the vertical direction to the ABS surface while thermal treatment was carried out at a temperature of 250 degrees C for 1 hour.

Embodiment 6

Figure 6:
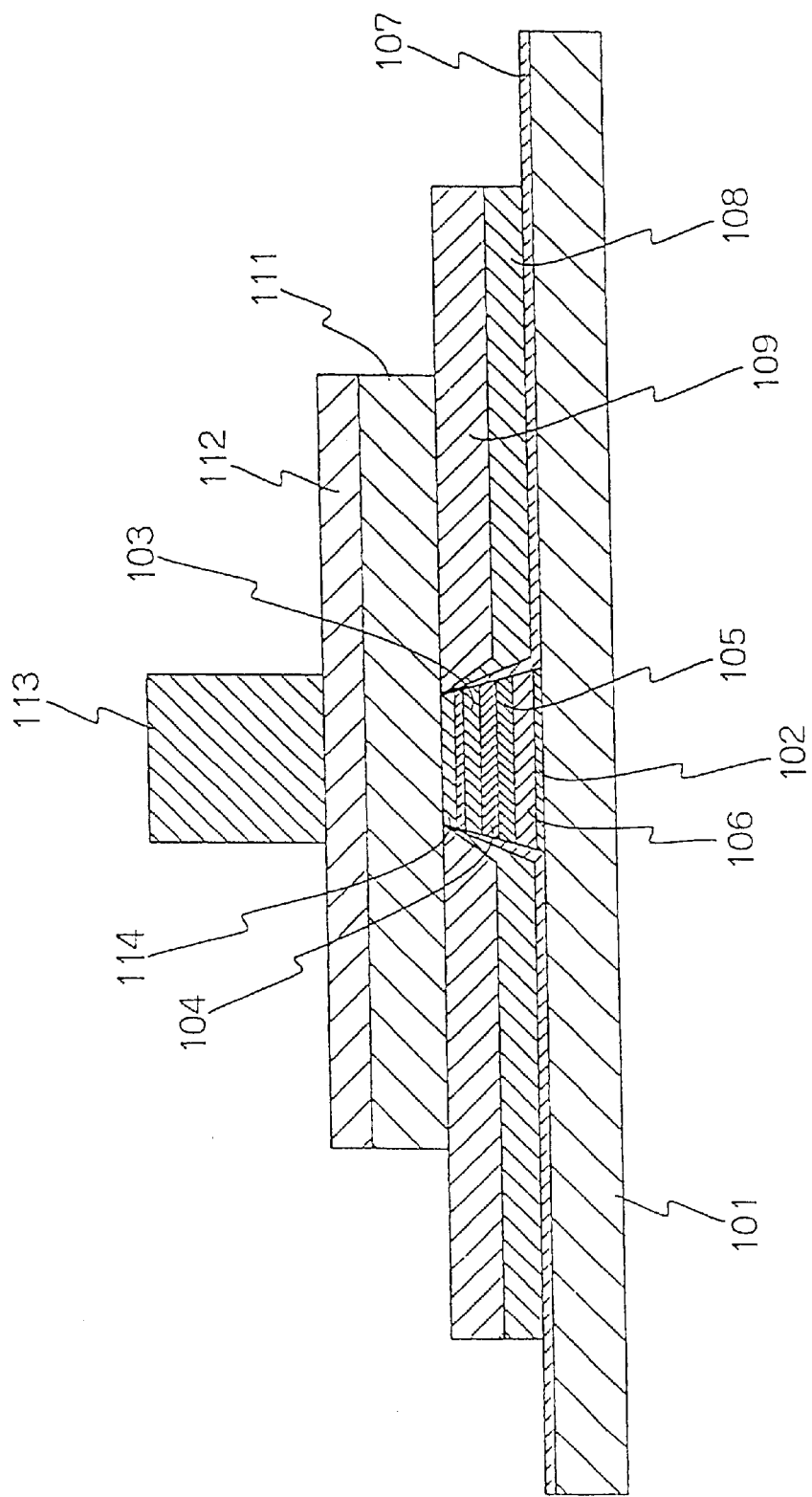
FIG. 6 shows a layered configuration of a magneto-resistance effect (MR) composite head according to a sixth embodiment of the present invention.

FIG. 6 shows a layered configuration o a magneto-resistance effect composite head according to a sixth embodiment of the present invention viewed from the ABS surface. The magneto-resistance effect composite head according to the sixth embodiment is identical to that of the second embodiment except for that the insulation layer 110 is absent between the non-magnetic layer 109 and the upper shield 111 serving also as the electrode 111. That is, the TMR film according to the sixth embodiment was constituted by following layers successively formed in this order from the side of the lower shield 101, by way of a continuous sputter deposition: a Ta film 102 with a thickness of 30 nm, an antiferromagnetic layer 106 of Pt—Mn film with a thickness of 20 nm; a first magnetic layer 105 made from a Co film with a thickness of 20 nm; and a conductive layer of Al film with a thickness of 2 nm. The same sputter apparatus used in embodiment 5 was used for oxidization of the Al conductive layer to form the tunnel barrier layer 104 with the same sputtering conditions as in Embodiment 1. Oxygen was exhausted to reach the background pressure before successively forming by way of sputter deposition a first ferromagnetic layer 103 of a Ni—Fe—Co film with a thickness of 10 nm and a non-magnetic conductive layer 114 of Ta film with a thickness of 30 nm, thus completing the TMR film. After this, in order to generate an exchange interaction magnetic field between the second ferromagnetic layer 105 and the antiferromagnetic layer 106 so as to fix the magnetization of the second ferromagnetic layer 105 in a direction vertical to the ABS surface in FIG. 1, a uni-directional magnetic field of 30 kOe was applied in vertical direction to the ABS surface while carrying out a thermal treatment at 270 degrees C. for 5 hours. This magnetic field had a direction vertically intersecting the direction of the magnetic field applied when the lower shield was subjected to the thermal treatment.

Evaluation of Embodiments 5 and 6

The TMR elements according to the fifth and the sixth embodiments were respectively cut off from the wafers and processed into a slider configuration for a magnetic disc, and then mounted on an arm having a gimbal spring for recording/reproduction evaluation. Here, the permanent magnet was magnetized with a magnetic field of 3 kOe. The magneto-resistance change ratio actually obtained was about 15%. The magneto-resistance change ratio died not change at all up to $10^3$ A/cm$^2$ while increasing the current density. At $5 \times 10^3$ A/cm$^2$, the resistance value stayed almost unchanged and the magneto-resistance change ratio decreased only by about 10%. The signal output voltage of the TMR head according to the fifth and the sixth embodiments was about 1 mV with a current density of $10^3$ A/cm$^2$ and about 3 mV with a current density of $5 \times 10^3$ A/cm$^2$. When used for a reproduction magnetic head, the TMR element according to the fifth embodiment can cope with a recording density of 3 Gb/in$^2$ or above, and the TMR element according to the sixth embodiment can cope with a recording density of 30 Gb/in$^2$ or above.

Embodiment 7

Figure 7:
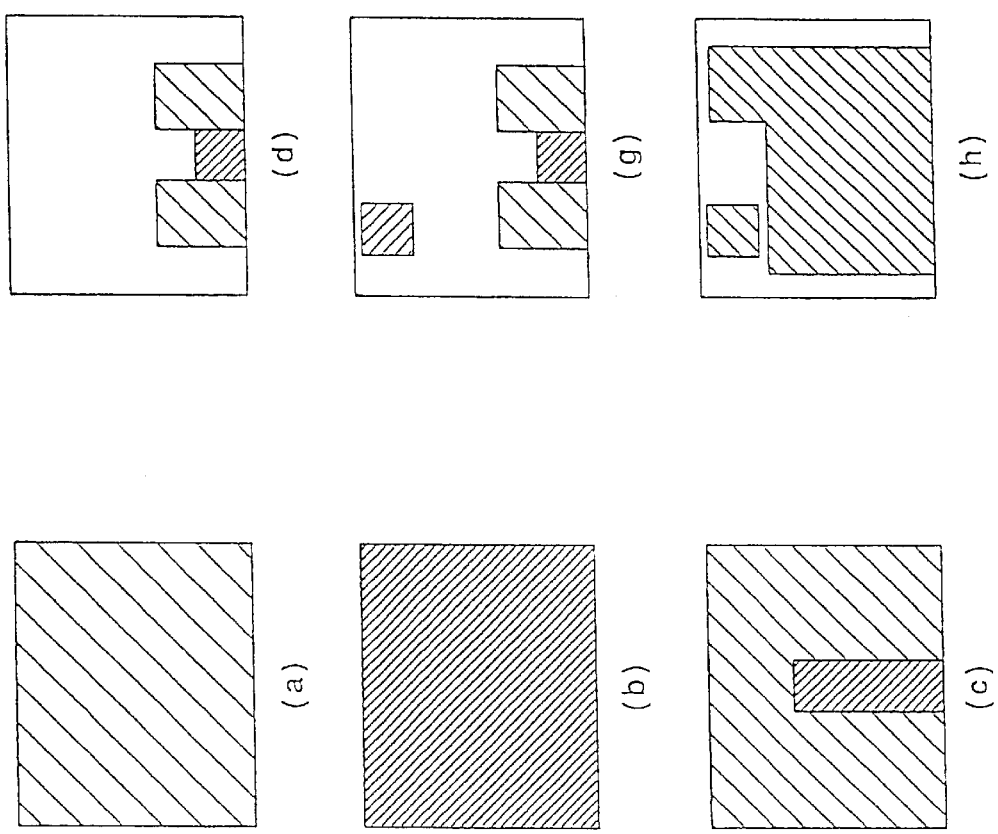
FIG. 7 shows a production procedure of a layered configuration of a magneto-resistance effect (MR) composite head according to a seventh embodiment of the present invention, including steps of forming a lower shield (A); undercoat/TMR film (B); TMR patterning (insulation/PM/non-magnetic insulation film formation) (C); element patterning (leaving the insulation film)(D); forming a hole in the insulation film (G); and a shield formation (H).

FIG. 7 shows a production procedure of a magneto-resistance effect type composite head according to the seventh embodiment. On a wafer substrate made from a composite ceramic of Al$_2$O$_3$—TiC constituting a slider, a FeZrN film was formed by sputtering so as to have a thickness of 1 micrometer, which was patterned as the lower shield 101 (FIG. 7A). This FeZrN film was subjected to a thermal treatment at a temperature of 500 degrees C. in a vacuum for 1 hour. During this thermal treatment, a uni-directional magnetic field was applied in the horizontal direction in FIG. 7.

Next, a TMR film was formed to constitute the center region by sputtering (FIG. 7B). Firstly, the lower shield 101 was covered with a Ta film 102 with a thickness of 30 nm, a first ferromagnetic layer 103 made from a Ni—Fe film with a thickness of 10 nm, and a conductive layer of an Al film with a thickness of 2 nm successively formed by sputter deposition in this order. This film formation was carried out using a high-frequency magnetron sputter apparatus having four 4-inch targets. The sputtering condition was set as follows: the background pressure $1 \times 10^{-7}$ Torr or below, Ar pressure 10 mTorr, high frequency power 200 W. Next, pure oxygen was introduced into the sputter apparatus and the oxygen pressure was maintained in a range from 20 mTorr to 200 Torr for 10 minutes for oxidizing the surface of the Al conductive layer to form the tunnel barrier layer 104. After the oxygen was exhausted to reach the background pressure, a second ferromagnetic layer 105 of a Co—Fe film with a thickness of 20 nm and an antiferromagnetic film of Ni—Mn film with a thickness of 20 nm were formed by way of sputter deposition, thus completing the TMR film.

The TMR film was patterned to form the center region. After this, an insulation film, a permanent magnet film (PM), and a non-magnetic film were formed as an end region to sandwich the center region, and lift-off was carried out (FIG. 7C). An element constituted by the center region and the end region was patterned (FIG. 7 D).

Figure 9:
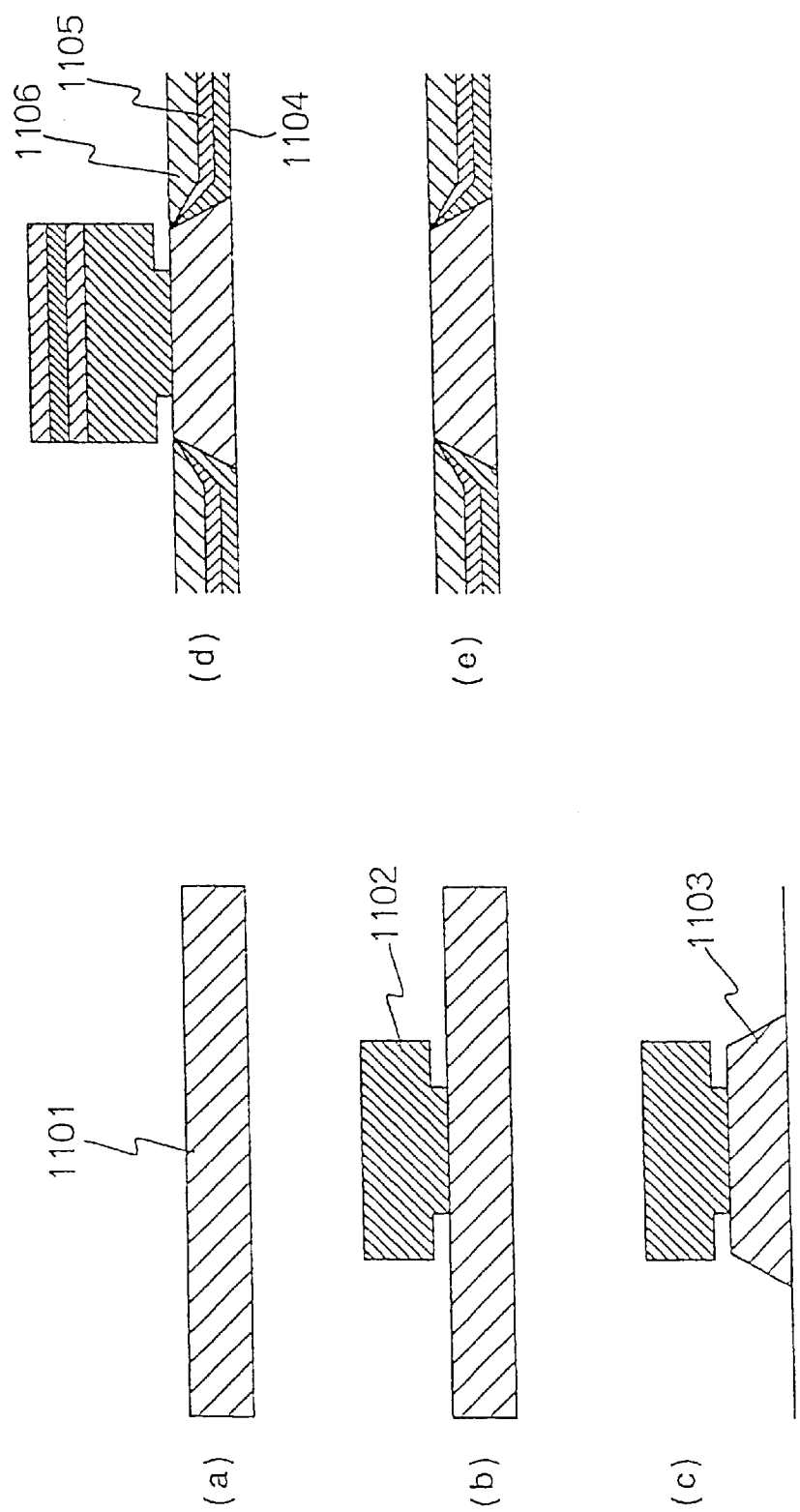
FIG. 9 shows a magneto-resistance effect (MR) composite head production procedure according to another embodiment of the present invention.
Figure 10:
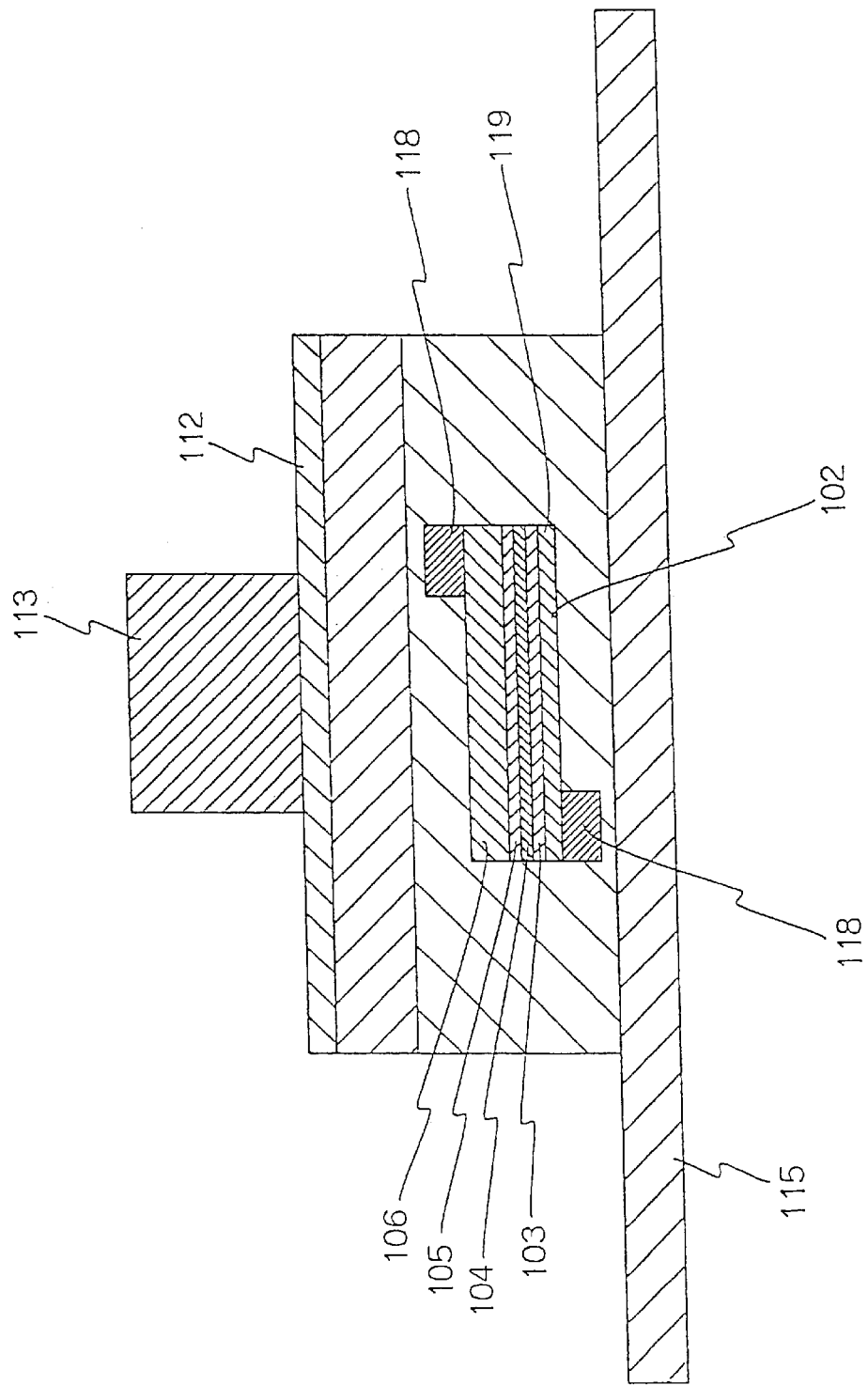
FIG. 10 shows a layered configuration of an MR composite head using a conventional ferromagnetic tunneling element.

FIG. 9 shows a patterning procedure carried out after formation of the TMR film described in the fifth and the sixth embodiments. The TMR film was formed by the aforementioned method (FIG. 9A); a photo-resist mask 1102 was formed (FIG. 9B); and the patterning was carried out using an ion beam (FIG. 9C).

With this photo-resist mask left, sputter deposition was carried out to form a non-magnetic insulation layer 1104 of alumina, a permanent magnet layer 1105 of CoCrPt, and a non-magnetic layer 1106 of Ta (FIG. 9D), and them lift-off was carried out (FIG. 9E). According to this method, the end face of the TMR film patterned is covered with the non-magnetic insulation layer before the permanent magnet layer is formed. Accordingly, no electrical short-circuit is caused between the two magnetic layers facing to each other via the tunnel barrier layer of the TMR film, enabling to maintain a preferable TMR characteristic.

After this, a hole was formed through the insulation film to use a part of the lower shield as an electrode (FIG. 7G). Furthermore, an upper shield of Ni—Fe film was formed with a thickness of 3 micrometers by way of the frame plating method (FIG. 7H).

After this, a magnetic gap was formed from alumina, and a coil for generating a recording magnetic field was formed. This coil was sandwiched by a photo-resist from its top and bottom for insulation. Firstly, a photo-resist pattern serving as the lower insulator was formed on the alumina magnetic gap and thermally hardened at 260 degrees C. for 1 hour. Next, the frame plating method was used to form a Cu coil, and a photo-resist pattern serving as the upper insulator was formed. This photo-resist pattern was also thermally hardened at 260 degrees C. for 1 hour. Furthermore, a Ni—Fe film with a thickness of 4 micrometers was formed by way of the frame plating method so as to constitute an upper magnetic pole for the recording function. After formation of this upper magnetic pole, a magnetic field of 1 kOe was applied in the direction of the axis of easy magnetization of the magnetic shield, and a thermal treatment was carried out at 200 degrees C. for 1 hour. This stabilized the magnetic anisotropy of the upper magnetic pole.

Next, an electrode pattern was formed for the reproduction block and the recording block before the entire element was protected by an alumina sputter film. After this, in order align the magnetization of the antiferromagnetic layer and the adjacent ferromagnetic layer, a uni-directional magnetic field of 3 kOe was applied in the vertical direction to the ABS surface while thermal treatment was carried out at 250 degrees C. for 1 hour.

The formation of the TMR film can also be carried out using the conventional method shown in FIG. 12. In this FIG. 12, the undercoat layer 10 is formed from Ta, and the first ferromagnetic layer 11 is formed from Ni—Fe (FIG. 12A). After this, oxygen is introduced into a vacuum to form an oxidized layer 21 on the surface of the first ferromagnetic layer 11 (FIG. 12B). In the next step, the Al film 12 is formed as a conductive layer, during which oxygen is diffused from the first ferromagnetic layer 11 into the conductive layer 12, thus obtaining an oxidized layer 23 at the side of the conductive layer 12 (FIG. 12C). After formation of the conductive layer 12, the vacuum is maintained while pure oxygen is introduced, so that on the surface of the conductive layer 12 oxidized naturally, a tunnel barrier layer 24 is formed in combination with the layer oxidized by the oxygen diffusion from the rear side (FIG. 12D). In this method, the oxidized layer 24 of the conductive layer 12 is formed on the both boundaries with the ferromagnetic layer. This enables to obtain an element having a further thermally stable characteristic. After the oxygen is exhausted, the second ferromagnetic layer 14 is formed from Ci—Fe (FIG. 12E), and the antiferromagnetic layer 15 is formed from Ni—Mn, thus completing the basic configuration of the MR element (FIG. 12F). The TMR film thus obtained exhibits characteristics similar to the TMR film obtained according to the fourth embodiment.

The element thus obtained was cut off from the wafers and processed into a slider configuration for a magnetic disc and mounted on a arm having a gimbal spring for evaluation of recording/reproduction characteristics. The elements exhibited similar results as those obtained by the fifth and the sixth embodiments Overall Evaluation In the Embodiments 1 to 7, the first ferromagnetic layer was made from a Ni—Fe film, but the first ferromagnetic layer is not to be limited to the Co—Fe film. The first ferromagnetic layer may also be made from Fe, Co, Ni, or an alloy containing these elements, so as to obtain similar results.

Moreover, the antiferromagnetic film is not to be limited to Ni—Mn but may also be made from an alloy containing as a main content Mn—X (X represents at least one element selected from a group consisting of Cr, Fe, Co, Ni, Tc, ru, Rh, Pd, Re, Os, Ir, and Pt) that enables to obtain similar results.

Moreover, the undercoat film of the TMR film is not to be limited to Ta but may also contain as a main content at least one element selected from a group consisting of Ti, V, Cr, Mn, Fe, Co, Ni, Cu, Zr, Nb, Mc, Tc, Ru, Rh, Pd, Hf, Ta, W, Re, Os, Ir, and Si. These elements also enable to obtain similar results.

Moreover, the magnetic shield is not to be limited to CoTaZr but may also be made from a soft magnetic alloy containing as a main content Fe, Co Ni; or an amorphous soft magnetic alloy containing as a main content Co—M (M represents at least one element selected from a group consisting of Ti, V, Cr, Fe, Ni, Cu, Zr, Nb, Mo, Tc, Ru, Rh, Pd, Hf, Ta, W, Re, Os, Ir, Pt, Si, and Al); or a soft magnetic alloy containing as a main content T—A—B (T represents at least one element selected from a group consisting of Fe, Co, Ni; A represents at least one element selected from a group consisting of Ti, V, Cr, Cu, Zr, Nb, Mo, Tc, Ru Rh, Pd, Hf, Ta, W, Re, Os, Ir, Pt, Si and Al; and B represents at least one element selected from a group consisting of B, N, and O); or a soft magnetic alloy containing as a main content Fe—Si—Al. These elements enable to obtain similar results.

Thus, the present invention enables to provide a magneto-resistance effect composite head comprising a TMR film element having a preferable resistance value as a head material that can preferably be used for a high-density magnetic recording and reproduction.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09-335501 (Filed on Dec. 5, 1997) including specification, claims, drawings and summary are incorporated herein by reference in its entirety.

What is claimed is:

1. A method of manufacturing a magneto-resistance effect composite head, comprising the sequential steps of:

forming a first magnetic shield on a slider;

forming a ferromagnetic tunnel junction magneto-resistance effect (hereinafter, referred to as TMR) element on the first magnetic shield, the TMR element having a center region comprised of a TMR film and an end region for applying a bias magnetic field to the TMR film;

forming a second magnetic shield overlying the TMR film and the end region, said step of forming the TMR element comprising the sequential steps of:

forming the TMR film by forming a first ferromagnetic layer, forming, on the first ferromagnetic layer, a tunnel barrier layer, forming, on the tunnel barrier layer, a second ferromagnetic layer, forming, on the second ferromagnetic layer, an antiferromagnetic film, after forming the TMR film, forming a non-magnetic insulation layer contacting an upper surface of the first magnetic shield and inclined vertical sides of the TMR film, the non-magnetic insulation being vertically tapered along the inclined vertical sides of the TMR film, forming a permanent magnet layer contacting the non-magnetic insulation layer, the permanent magnet layer being vertically tapered along the inclined vertical sides of the TMR film, the vertical sides of the TMR film being coated with the non-magnetic insulation layer before formation of the permanent magnet layer to prevent electrical short-circuiting between the first and second ferromagnetic layers separated by the tunnel barrier layer.

2. The method of claim 1, comprising the further steps of:

between the steps of forming the TMR element and forming the second magnetic shield overlying the TMR film and the end region, forming an insulation layer overlying the permanent magnet layer and exposing an upper surface of the TMR film to define a reproduction track.

3. The method of claim 2, comprising the further steps of:

forming a magnet gap on the second magnetic shield; and forming an upper magnetic pole on the magnetic gap, wherein, the second magnetic shield serves as a first magnetic pole and the upper magnetic pole serves as a second magnetic pole, and the first magnetic shield is configured as a first electrode and the second magnetic shield is configured as a second electrode.

4. The method of claim 2, wherein, the TMR film is patterned by ion beaming using a T-shaped photo-resist mask placed on an upper surface of the TMR film, and said steps of forming the non-magnetic insulation layer and forming the permanent magnet layer, are performed with the T-shaped photo-resist mask remaining in place.

5. The method of claim 4, wherein, after said steps of forming the non-magnetic insulation layer and forming the permanent magnet layer are completed, the T-shaped photo-resist mask is removed, another T-shaped photo-resist mask is formed prior to said step of forming the insulation layer overlying the permanent magnet layer, and removing the another T-shaped mask forms a hole through the insulation layer overlying the permanent magnet layer to provide an opening exposing the upper surface of the TMR film to define the reproduction track.

6. The method of claim 5, wherein a width of the another T-shaped mask is no greater than a corresponding width of the T-shaped mask.

7. The method of claim 1, comprising the further steps of:

between the steps of forming the TMR element and forming the second magnetic shield contactingly overlying the TMR film and the end region, forming an insulation layer overlying the permanent magnet layer, wherein an upper surface of the TMR film defining a reproduction track is separated from the second magnetic shield by the insulation layer.

8. A method of manufacturing a magneto-resistance effect composite head, comprising the steps of:

forming a first magnetic shield on a slider;

forming a TMR film by forming a first ferromagnetic layer, forming a tunnel barrier layer on the first ferromagnetic layer, forming a second ferromagnetic layer on the tunnel barrier layer, forming an antiferromagnetic film on the second ferromagnetic layer, using a T-shaped mask and patterning the ferromagnetic layers and the tunnel barrier layer to form a TMR film with inclined vertical side walls;

after forming the TMR film and with the T-shaped mask remaining in place, forming a non-magnetic insulation layer contacting an upper surface of the first magnetic shield and the inclined vertical sides of the TMR film, the non-magnetic insulation being vertically tapered along the inclined vertical sides of the TMR film;

forming a permanent magnet layer contacting the non-magnetic insulation layer, the permanent magnet layer being vertically tapered along the inclined vertical sides of the TMR film, the vertical sides of the TMR film being coated with the non-magnetic insulation layer before formation of the permanent magnet layer to prevent electrical short-circuiting between the first and second ferromagnetic layers separated by the tunnel barrier layer; and forming a second magnetic shield overlying the TMR film.

9. The method of claim 8, comprising the further steps of:

between the steps of forming the TMR film and forming the second magnetic shield overlying the TMR film and the end region, forming an insulation layer overlying the permanent magnet layer and exposing an upper surface of the TMR film to define a reproduction track.

10. The method of claim 9, comprising the further steps of:

forming a magnetic gap on the second magnetic shield; and forming an upper magnetic pole on the magnetic gap, wherein, the second magnetic shield serves as a first magnetic pole and the upper magnetic pole serves as a second magnetic pole, and the first magnetic shield is configured as a first electrode and the second magnetic shield is configured as a second electrode.

11. The method of claim 10, wherein, after said steps of forming the non-magnetic insulation layer and forming the permanent magnet layer are completed, the T-shaped photo-resist mask is removed, another T-shaped photo-resist mask is formed prior to said step of forming the insulation layer overlying the permanent magnet layer, and removing the another T-shaped mask forms a hole through the insulation layer overlying the permanent magnet layer to provide an opening exposing the upper surface of the TMR film to define the reproduction track.

12. The method of claim 11, wherein a width of the another T-shaped mask is no greater than a corresponding width of the T-shaped mask.

13. The method of claim 8, comprising the further steps of:

between the steps of forming the TMR film and forming the second magnetic shield overlying the TMR film and the end region, forming an insulation layer overlying the permanent magnet layer, wherein an upper surface of the TMR film defining a reproduction track is separated from the second magnetic shield by the insulation layer.

* * * * *